United States Patent
Radin

[15] 3,641,544
[45] Feb. 8, 1972

[54] LOW-LIQUID LEVEL INDICATOR
[72] Inventor: Bernard G. Radin, Oak Park, Mich.
[73] Assignee: Ford Motor Company, Dearborn, Mich.
[22] Filed: June 22, 1970
[21] Appl. No.: 48,218

[52] U.S. Cl. ...............................340/244 C, 340/59, 73/304
[51] Int. Cl. ..........................................................G08b 7/00
[58] Field of Search...................340/244, 244 C, 59; 73/304, 73/304 C, 313

[56] References Cited

UNITED STATES PATENTS

| | | | |
|---|---|---|---|
| 3,392,349 | 7/1968 | Bartley | 340/244 C |
| 2,946,991 | 7/1960 | Lindenberg | 340/244 C |
| 3,277,711 | 10/1966 | Roberge | 73/304 C |

Primary Examiner—John W. Caldwell
Assistant Examiner—Howard Cohen
Attorney—John R. Faulkner and Keith L. Zerschling

[57] ABSTRACT

A low-liquid level indicator particularly adapted for use in an automotive vehicle which employs an oscillator whose tank coil is shunted by a probe adapted to be immersed in a liquid. When the liquid level is satisfactory, the probe is immersed in the liquid and its impedance will be relatively low thereby reducing the Q of tank circuit to a value where no oscillations will be produced. When the liquid level falls to an unsatisfactory level, the probe will no longer be immersed in the liquid, and its impedance will be increased sharply thereby resulting in oscillations being produced by the oscillator. This change, between the nonoscillatory and the oscillatory states, is sensed by a solid-state switching network which controls the energization of a warning means, preferably in the form of a lamp. The warning means is energized when the probe is not immersed in the liquid and the oscillator is in an oscillatory state.

6 Claims, 2 Drawing Figures

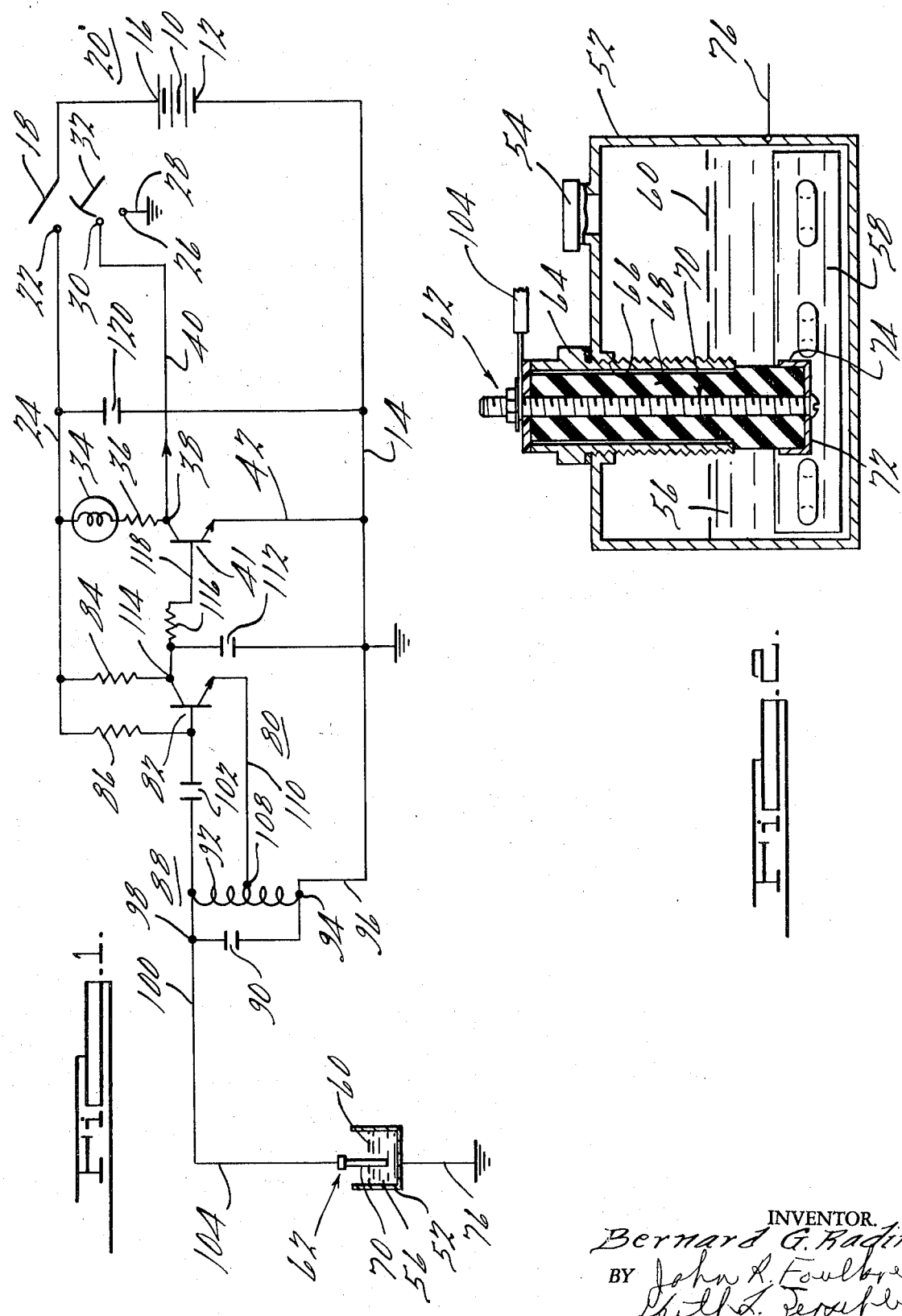

LOW-LIQUID LEVEL INDICATOR

BACKGROUND OF THE INVENTION

This invention relates to a low-liquid level indicator and, more particularly, to a low-liquid level indicator that may be readily used to indicate a low-liquid level in a container, for example, a radiator used in an automotive vehicle.

In the conductivity type of liquid level sensors, alternating current is used in preference to direct current because it eliminate plating or deposits on the electrodes of the probe immersed in the liquid. There have been suggestions in the prior art for using an alternating current to energize liquid level sensing means. It has been suggested, for example, that in an automotive vehicle, alternating current be derived from the stator windings of the alternator employed to generate electrical energy for charging the vehicle battery and for operating the electrical loads of the vehicle. The present invention utilizes a novel liquid level detector or indicator circuit and includes an inexpensive and reliable means for generating an alternating current applied to a probe and a container carrying a liquid in order to sense the liquid level in the container.

SUMMARY OF THE INVENTION

In the present invention, an oscillator is employed having an LC tank circuit shunted by the container holding the liquid and a probe which is adapted to be immersed in the liquid and a probe which is adapted to be immersed in the liquid when the liquid level is satisfactory. This oscillator preferably includes a solid state active element having one output electrode connected to a source of direct current electrical energy, and the other output electrode connected to the coil or inductance of the tank circuit.

When the liquid level is satisfactory, the probe of the present invention is immersed in or otherwise completes a circuit through the liquid to the container. This results in a low-impedance path being connected to shunt with the LC tank circuit of the oscillator. This impedance has a value such that no, or relatively small, oscillations are generated by the oscillator. At this time, the active element is so connected that it draws considerable current. When, however, the probe comes out of contact with the liquid due to the level of the liquid falling to an unsatisfactory level, the impedance, connected across the LC tank circuit, rises sharply thereby raising the Q of the LC tank circuit sufficiently to cause relatively large oscillations to emanate from the oscillator. This reduces the current flow through the solid-state active element. This difference in current flow through the solid-state active element is sensed by a solid state switching device which is connected to control a warning means, preferably in the form of a warning lamp.

When the current drawn by the solid state active element is relatively large, as a result of the oscillator being in the nonoscillatory mode, the solid-state switching elements will be in a nonconducting state, and the warning means or lamp will not be energized. On the other hand, when the oscillator switches into its oscillatory mode due to the liquid level falling below a satisfactory operating level, the current drawn by the solid-state active element will be reduced sharply thereby switching the solid-state switching device to a conducting state and energizing the warning means or lamp.

An object of the present invention is the provision of a low-liquid level indicator which is inexpensive and reliable.

Another object of the invention is the provision of a low-liquid level indicator which is inexpensive and reliable and employs alternating current electrical energy to energize a liquid level sensing probe in the container holding the liquid.

A further object of the invention is the provision of a low-liquid level indicator of the oscillatory type in which the oscillations, generated across a tank circuit of an oscillator, are employed to energize the liquid level sensing probe.

Other objects and attendant advantages of the present invention will become more readily apparent as the specification is considered in connection with the attached drawings.

BRIEF DESCRIPTION OF THE DRAWINGS

FIG. 1 is a circuit diagram of the low-liquid level indicator of the present invention; and FIG. 2 is a sectional view through a liquid container and showing the relationship of the container, the liquid and the probe of the present invention.

DESCRIPTION OF THE PREFERRED EMBODIMENT

Referring now to the drawings in which like reference numerals designate like parts throughout the views thereof, there is shown in FIG. 1 a source of direct current electrical energy, in the form of an electrical storage battery 10, having one terminal thereof, negative terminal 12, connected to a grounded line 14, and the other terminal thereof, positive terminal 16, connected to a conductive movable arm 18 of ignition switch 20. The ignition switch 20 has an "ON" terminal 22 connected to a line 24. The ignition switch 20 also has a second stationary terminal 26 associated therewith that is connected to ground through a lead 28 and a third stationary terminal 30. A second conductive movable arm 32 is operated with the first movable arm 18. When the ignition switch 20 is moved to the start position for energizing the starting motor (not shown) of the automotive vehicle with which the present invention may be associated, the movable arm 32 conductively connects the stationary contact 26 with the stationary contact 30.

A warning means, preferably in the form of a warning lamp 34, has one terminal connected to the line 24 and the other terminal connected to one terminal of a resistor 36. The other terminal of the resistor 36 is connected to the stationary contact or terminal 30 of ignition switch 20 via junction 38 and lead 40.

A solid-state switching device 41 is employed to control the energization of the warning means or lamp 34. This solid-state switching device preferably comprises a transistor having one of its output electrodes, for example, its collector, connected to the junction 38 and, hence, to the resistor 36. Its other output electrode, for example, its emitter, is connected to grounded line 14 via lead 42.

Referring now to FIG. 2, there is shown a container 52 having a closure cap 54 for replenishment of a liquid 56 carried by the container 52. The container 52 is represented here in schematic form and it may be a radiator of an automotive vehicle, in which case, the structure designated by the numeral 58 is the radiator core. The liquid in the container should have a liquid level 60 that covers this core. A probe, generally designated by the numeral 62, includes a threaded outer casing 64 that is threaded into a threaded bore 66 in the container 52. An electrical insulating bushing 68 electrically insulates the operative cylindrical portion 70 of the probe from the threaded outer casing 64.

This operative cylindrical portion 70 of the probe 62 may be constructed of a suitable metal, for example, steel or brass, and it extends completely through the electrical insulating bushing 68. A metal cap 72, connected to the operative cylindrical portion 70, extends across the lower end of the electrical insulating bushing 68 and it has an axially extending cylindrical flange 74 which extends upwardly over the lower end of the electrical insulating bushing 68. The container 52 is also constructed of an electrically conductive material, for example, brass, copper or steel, and it has a lead 76 electrically connected to it.

When the liquid 56 has a satisfactory operating level, the threaded outer casing 64, which is constructed of a conductive material, is immersed in the liquid so that the liquid serves to provide an electrical path between the cap 72, connected to operative cylindrical portion 70 of the probe, and this threaded outer casing 64.

Referring back to FIG. 1, there is shown an oscillator 80 comprising a solid state active element 82, preferably in the form of a transistor, having one of its output electrodes, for example, its collector, connected to line 24 through a resistor 84, and its control or base electrode connected to line 24 through a resistor 86.

The oscillator 80 also comprises a tank circuit 88 having a capacitor 90 connected in parallel with an inductor or coil 92. The tank circuit 88, therefore, is a conventional LC tank circuit. One terminal 94 of the LC tank circuit 88 is connected to grounded line 14 via lead 96, while the other terminal thereof, terminal 98, is connected to a line 100. The line 100 in turn is coupled to the base or control electrode of the solid state active element 82 via a coupling capacitor 102. This line 100 is also connected to the operative cylindrical portion 70 of the probe 62 via lead 104.

The other output electrode of the solid state active element 82, for example, the emitter, is connected to a tap 108 on the inductor or coil 92 of the tank circuit 88 via lead 110. In addition, the output electrode, for example, the collector, is connected to grounded line 14 via a capacitor 112 to provide a low-impedance return path for the collector to the inductor or coil 92 of the tank circuit 88.

The output terminal of the oscillator 80 is at a junction 114 connected intermediate the resistor 84 and the collector of the solid-state active element 82. This junction 114 is connected to the base or control electrode of the solid-state switching device 41 via resistor 116 and lead 118.

A capacitor 120 may be connected across the line 24 and the grounded line 14. This capacitor serves as a bypass to improve the stability of the circuit by removing the common impedance of the source of electrical energy 10 for the resistors 84 and 86 and the series circuit of the warning lamp 34 and resistor 36.

It is preferred that the value of the inductance of coil or inductor 92 and the value of the capacitance of capacitor 90 be selected such that the oscillator 80 will produce oscillations in the radio frequency range.

OPERATION

During starting operations of the automotive vehicle that employs the present invention, the ignition switch 20 is moved so that the movable arm 18 engages the "ON" terminal 22 and a start terminal (not shown) that is connected to the starter motor (not shown). Additionally, the movable arm 32, that operates with the movable arm 18, is moved so that it connects the stationary contact 26 with the stationary contact 30. As a result, a circuit is completed from the "ON" terminal 22 through line 24, warning means or lamp 34, resistor 36, junction 38, lead 40, stationary contact 30, movable arm 32, stationary contact 26 and lead 28 to ground. This provides a means for checking the operative condition of the warning lamp or means 34 when the automotive vehicle engine, of the vehicle employing the present invention, is initially started.

After the engine is started, the movable arm 32 is moved to disconnect the stationary contact 30 from the stationary contact 26 thereby deenergizing the warning means or lamp 34. At the same time, the movable arm 18 stays in contact with the "ON" terminal 22 of ignition switch 20 so that the line 24 remains energized. With the line 24 energized, the solid-state active element 82 is switched into a conducting state since its base is connected to line 24 via resistor 86, and its emitter is connected to grounded line 14 via lead 110, tap 108, a portion of the coil or inductor 92, terminal 94 and lead 96. The switching of the solid-state active element 82 into a conducting state provides a low-impedance path to ground for current flowing from line 24 through resistor 84. As a result, there is insufficient current flow into the base or control electrode of solid-state switching device 41 to switch it to a conducting state. As a result, the warning lamp or means 34 is not energized.

If at this time, the liquid level 60 of liquid 56 is at a satisfactory operating level, the probe 62, together with the container 52 and the liquid contained therein, will provide a low-impedance path in shunt with the tank circuit 88 of the oscillator 80. As explained above, with this low-impedance path shunting the tank circuit, the oscillator 80 will not oscillate, or will oscillate at a very low level, thereby keeping the solid state active element 82 conducting and the solid state switching device 41 nonconducting. Consequently, the warning lamp or means 34 will remain unenergized.

If the liquid level 60 in the container 52 falls below the satisfactory operating level, so that the end of the threaded outer casing 64 is above the level of the liquid 56, the circuit path from the cap 72 of the central operative portion 70 of probe 62 and the end of the threaded outer casing 64 will no longer be through the liquid 56. As a result, the impedance of the circuit from the operative central portion 70 of the probe to the container 52 will increase markedly. This increase in impedance will raise the Q of the tank circuit 88 sufficiently to bring the oscillator 80 into a highly oscillatory condition.

When the oscillator 80 is brought into a highly oscillatory condition, the average current through the solid-state active device 82 will decrease thereby raising the potential of the junction 114 and sending sufficient current from junction 114 through resistor 116 and lead 119 into the control or base electrode of the solid-state switching device 41 to switch it to a conducting state. The warning means or lamp 34 will then be energized from the line 24 through resistor 36 and the low-impedance path provided by the output electrodes of the solid-state switching device 41. Consequently, the vehicle operator will be warned that the liquid 56 in the container 52 has fallen below a satisfactory operating level.

When the vehicle operator is so warned, he may take corrective action to replenish the liquid in the container 52. When this has been accomplished and the liquid level rises above the end of the threaded outer casing 64, a circuit will be completed through the liquid 56 between the cap 72 of the central operative portion 70 of the probe 62 and this outer threaded casing 64. As a result, the impedance of this circuit, which is connected across the tank circuit 88, will decrease markedly thereby lowering the Q of the tank circuit 88 to a value where the oscillator 80 no longer produces oscillation of any substantial magnitude. When this happens, the current through the solid-state active device 82 will increase markedly to a point where current into the base or control electrode of the solid-state switching device 41 from junction 114 via resistor 116 and lead 118 is no longer sufficient to maintain the solid state switching device 41 in a conducting state. Consequently, the solid-state switching device 41 switches to a nonconducting state, and the warning lamp or means 34 is deenergized.

Thus, the present invention provides a reliable, uncomplicated low-liquid level indicator which employs alternating current generated in the tank circuit of an oscillator to energize the liquid level sensing means in the form of a probe adapted to be immersed in the liquid. The Q of the tank circuit of the oscillator is raised to a sufficient level to permit oscillations and thereby give a warning when the liquid in the container falls below a satisfactory operating level.

I claim:

1. A low-liquid level warning indicator including a container having a liquid positioned therein the level of which is to be indicated, a source of direct current electrical energy, an oscillator comprising a solid state active element having a control electrode and a pair of output electrodes, means connected to the control electrode of said solid state active element and to said source of direct current electrical energy for biasing said solid-state active element into a heavily conducting state, an LC tank circuit coupled to said control electrode and said output electrodes, a probe associated with said container, said probe, liquid and container forming an impedance element connected in parallel with said LC tank circuit, the impedance of said impedance element being changed from a first level to a second higher level when the level of liquid is changed from a satisfactory level to an unsatisfactory level whereby the magnitude of the oscillations produced by said LC tank circuit increases, circuit means connected to said solid state active element and said LC tank circuit for decreasing substantially the conduction of said solid-state active element when said oscillations increase in magnitude and means responsive to such decrease in the conduction of said solid state active element for indicating that the level of said liquid has fallen to an unsatisfactory level.

2. The combination of claim 1 in which said means responsive to the increase in the magnitude of oscillations comprises a solid-state amplifier having a control electrode connected to one of the output electrodes of said oscillator and a pair of output electrodes connected to said source of direct current electrical energy, a warning means connected in series with said pair of output electrodes and said source of direct current electrical energy.

3. The combination of claim 1 in which said means responsive to the decrease in the conduction of said solid state active element comprises a solid-state switching device having a control electrode and a pair of output electrodes and a warning means, said control electrode connected to one of the output electrodes of said solid state active element and to said source of direct current electrical energy, said warning means being connected in series with said source of direct current electrical energy and the output electrodes of said solid state switching device.

4. A low-liquid level warning indicator including a container having a liquid positioned therein, the level of which is to be indicated, a source of direct current electrical energy, an oscillator comprising a solid-state active element having a control electrode and a pair of output electrodes, means connected to the control electrode of said solid state active element and to said source of direct current electrical energy for biasing said solid state active element into a heavily conducting state, an LC tank circuit coupled to said control electrode and said output electrodes, a probe associated with said container, said probe, liquid and container forming an impedance element connected in parallel with said LC tank circuit, the Q of said LC tank circuit being changed from a first low level to a second higher level when the level of liquid is changed from a satisfactory level to an unsatisfactory level whereby oscillations produced by said LC tank circuit increase, circuit means connected to said solid state active element and said LC tank circuit for decreasing substantially the conduction of said solid state active element when the Q of said LC tank circuit increases and the magnitude of the oscillations produced increase, a solid state amplifier having a control electrode connected to one of the output electrodes of said solid state active element and a pair of output electrodes, circuit means connecting said solid state amplifier and said solid state active element for increasing the conduction of said solid state amplifier when the conduction of said solid state active element decreases and a warning means connected in series with the output electrodes of said amplifier and said source of direct current electrical energy.

5. The combination of claim 4 in which said low-liquid level warning indicator is employed to indicate the level of a liquid positioned in a container in an automotive vehicle, said automotive vehicle including an internal combustion engine, a starter motor for said internal combustion engine and an ignition switch, means coupled to said source of direct current electrical energy and said ignition switch for directly connecting said warning means to said source of direct current electrical energy when the ignition switch is moved to a position to connect said source of direct current electrical energy to said starter motor.

6. The combination of claim 5 in which said means for connecting said source of direct current electrical energy with said warning means comprises a first lead connecting one terminal of said source of direct current electrical energy to one terminal of said warning means and means included within said ignition switch for connecting the other terminal of said warning means which is connected to one output electrode of said amplifier to the other terminal of said source of direct current electrical energy.

* * * * *